Figure 1:
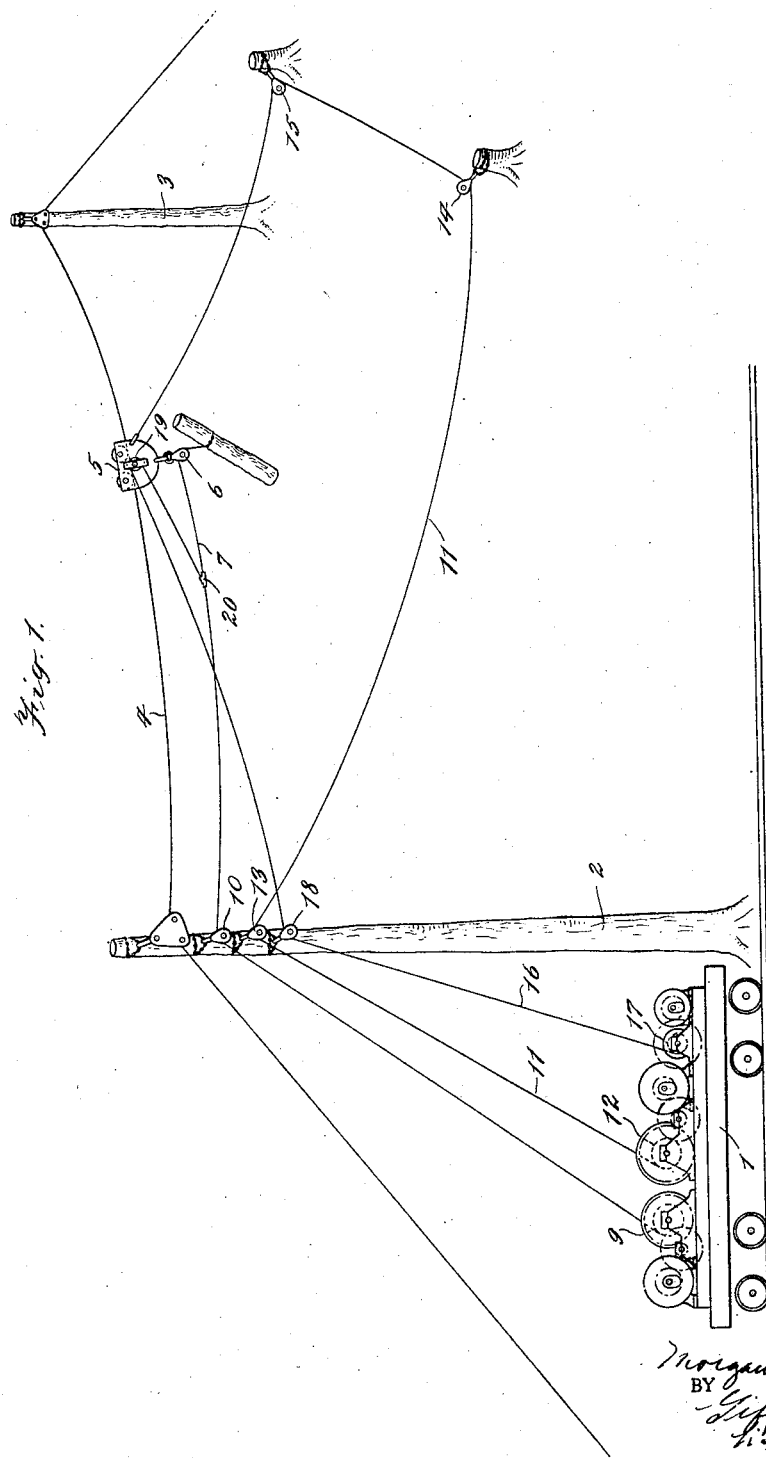

Dec. 28, 1926.  
M. WASHBURN, JR  
1,612,404  
ELECTRIC TRAVERSING SYSTEM  
Filed Jan. 29, 1926  
5 Sheets-Sheet 1

INVENTOR  
Morgan Washburn Jr  
BY  
Gifford Scull  
ATTORNEYS

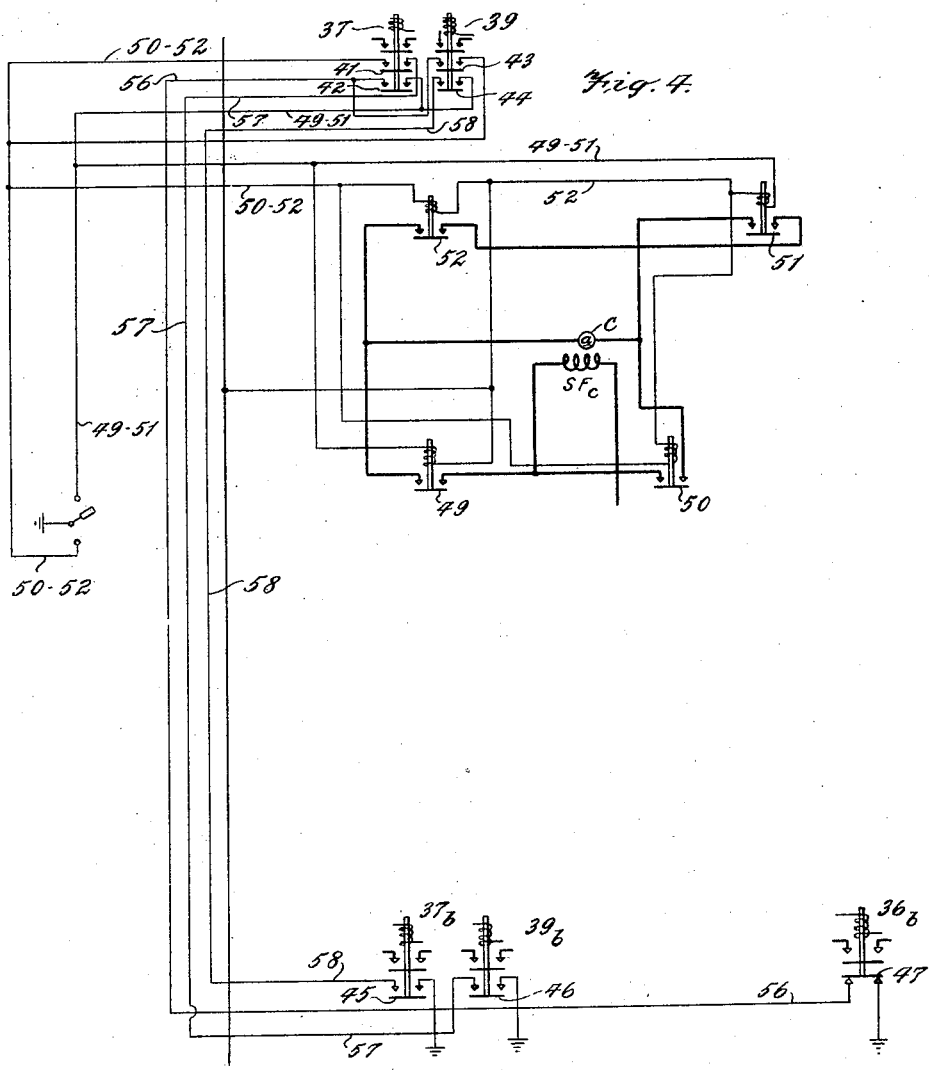

Dec. 28, 1926.

M. WASHBURN, JR 1,612,404

ELECTRIC TRAVERSING SYSTEM

Filed Jan. 29, 1926    5 Sheets-Sheet 5

INVENTOR
Morgan Washburn, Jr.,
BY
ATTORNEYS

Patented Dec. 28, 1926.

1,612,404

UNITED STATES PATENT OFFICE.

MORGAN WASHBURN, JR., OF LOS ANGELES, CALIFORNIA, ASSIGNOR TO LIDGERWOOD MANUFACTURING COMPANY, OF NEW YORK, N. Y., A CORPORATION OF NEW YORK.

ELECTRIC TRAVERSING SYSTEM.

Application filed January 29, 1926. Serial No. 84,569.

My present invention relates to cable way systems and has particular reference to improved means for driving such systems.

In traversing systems, of the type used in logging apparatus, it has heretofore been the practice particularly in engine driven systems, to provide a single motor or other prime mover which is connected to the various drums through appropriate gearing. In the type of apparatus mentioned, two main drums are provided, one of which is used to wind in the inhaul cable operatively attached to the carriage bearing the load, while the other drum is used to haul in the outhaul cable to accomplish the return of the carriage to the loading point. Therefore, one drum must pay out cable as the other pays in and vice versa. In systems of the type described which are driven by a single power unit it is necessary to have the two main drums geared to one another through appropriate clutch mechanisms or "frictions", whereby both the drums are normally rotated at the same speed and in reverse directions. Due, however, to the changing effective diameters of the drums, rotating the drums at the same speed does not result in paying out one cable at precisely the same rate as the other cable is paid in, this difference in rate becoming greater, the more unequal the number of layers of cable on the respective drums becomes. In practice, this unequal pay-in and pay-out is compensated for by the operator from time to time slipping the clutch mechanisms or "frictions" between the gears and the drums, and if the case requires it, applying a brake to the drum thus freed of the gear.

This manner of equalizing the rate of travel of the two cables, however is wasteful of power and subjects the clutch mechanisms involved to considerable wear.

It is one of the objects of my present invention to overcome the above mentioned difficulty by providing a separate motor preferably directly connected to each of the above mentioned drums. Moreover, this idea of separately driven drum units may be extended so as to include a third drum upon which is wound the so-called slack-pulling cable, the function of which is to overcome the weight of the inhaul cable, which tends to prevent the end of the cable from descending to the ground after the carriage has been hauled back to the point of reloading.

My invention also involves the speed and direction control of the various motors, including an arrangement of circuits for effecting and varying the degree of dynamic braking during such periods of operation as braking may be necessary or desirable. Preferably I provide means for driving the various motors as series motors during such periods as require their maximum output and as shunt motors during such other periods as require only a light power output or dynamic braking. Thus I may drive each main motor as a series motor in the "in" direction, i. e., when the cable is being wound in, and as a shunt motor when each drum is driven in the reverse direction, or is paying out. In the case of the slack-pulling motor which for a comparatively brief period only throughout the operating cycle must exert its maximum power, I also provide means for either shunt or series operation.

In order that the number of controls may not become excessive, it is a further object of my invention to provide automatic means for determining the direction of operation of the slack pulling motor whereby the operator need only determine its speed and power characteristics.

Figure 2:
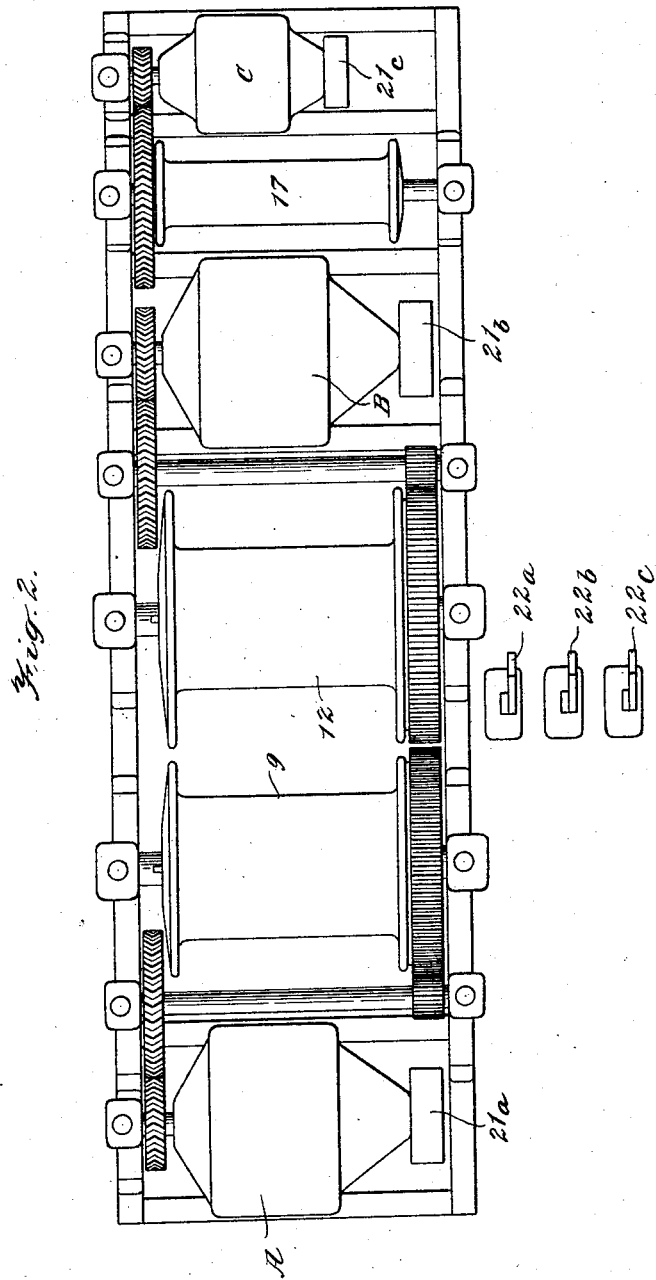
Figure 3:
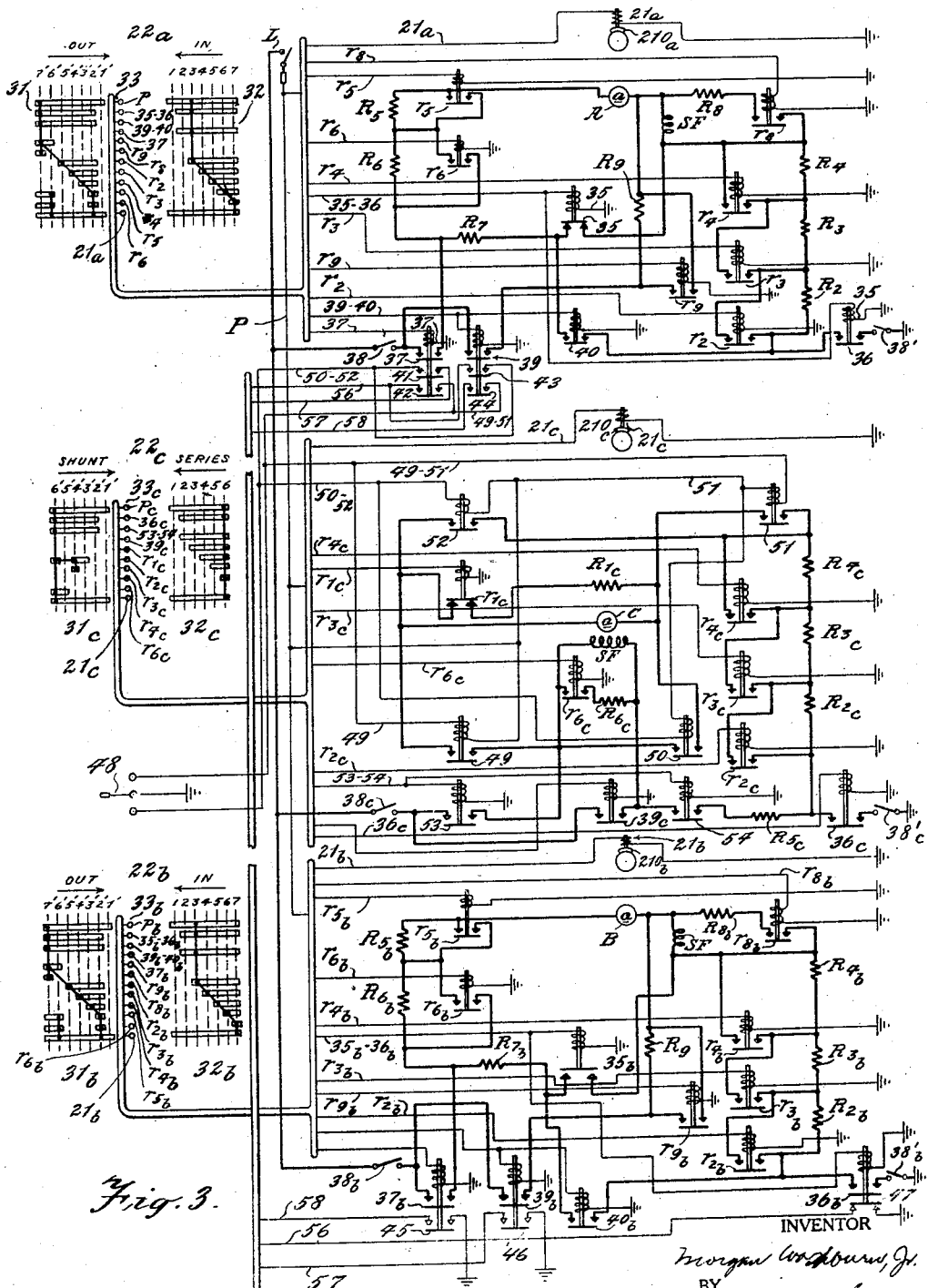
Figure 5A:
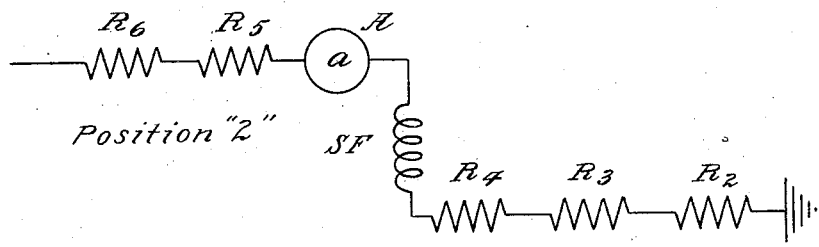
Figure 6:
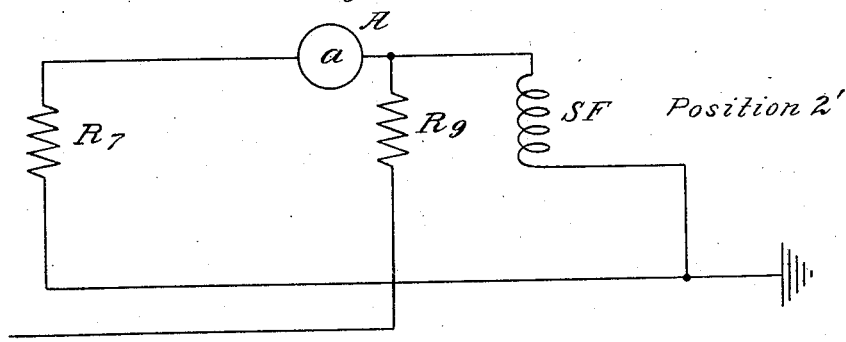
Figure 7:
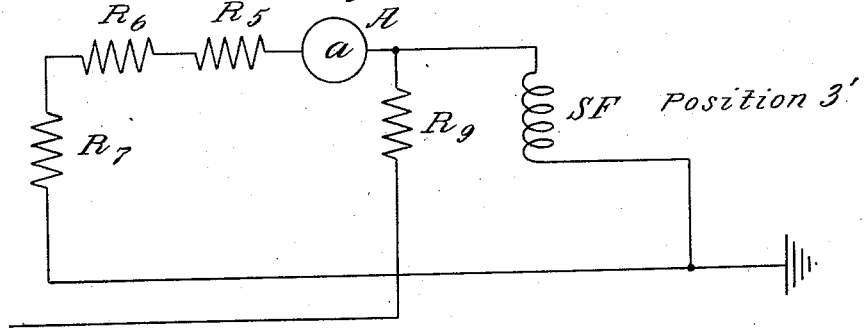
Figure 8:
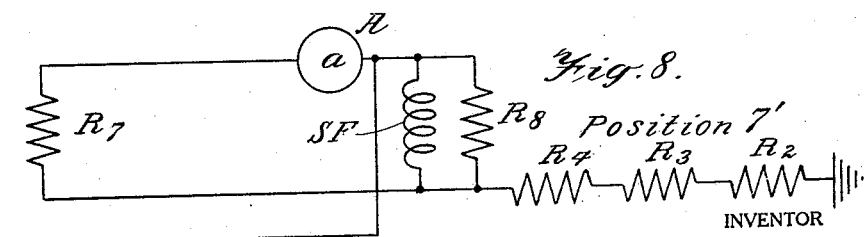

In the accompanying drawings, Fig. 1 illustrates a typical cableway or traversing system to which my invention has been applied; Fig. 2 is an enlarged plan view of the various drums and motors seen in Fig. 1; Fig. 3 is a diagram of the controlled circuits for the entire three motors; Fig. 4 is a diagram of the circuits for determining the direction of operation of the slack-pulling motor and is separately reproduced from Fig. 3 for the sake of clearness; Fig. 5 is a diagram showing the dynamic braking circuit obtained at positions 1 and 1' of the controller. Fig. 5ª is a diagram of the circuit used for starting each of the main motors when operating as a series motor; and Figs. 6, 7 and 8 are circuit diagrams for various controller positions for shunt operation and for dynamic braking.

The cable system to which my invention has been shown applied will now be described. Referring to Fig. 1, 1 designates the platform of a portable power apparatus of a logging system, in which a head tree 2 and a tail tree 3 support a main cable 4, the ends of the latter being secured to stumps or the like, not shown. A skidding carriage 5 runs along the main cable 4 and carries a skidding block 6 through which passes the skidding or inhaul line 7. The free end of the skidding line 7 is adapted for securing a log or other load while the other end is secured to the skidding or inhaul drum 9 after passing through a second skidding block 10 secured to the head tree. The receding or outhaul line 11 secured to the receding or outhaul drum 12 passes through a block 13 secured to the head tree 2. Outhaul line 11 passes through blocks 14 and 15 attached to stumps, as shown, its other end being secured to carriage 5. A slack pulling line 16 is secured at one end to slack pulling drum 17 and passes through a block 18 on head tree 2 through a block 18 on head tree 2 through pulley 19 on carriage 5 to a swivel 20 on inhaul line 7.

As more clearly shown in Fig. 2, inhaul drum 9 is directly connected through appropriate gearing to electric motor A, outhaul drum 12 to electric motor B and slack pulling drum 17 to electric motor C. Each of the three motors is equipped with an electrical brake actuating mechanism $21_a$, $21_b$ and $21_c$, respectively. Separate controllers $22_a$, $22_b$ and $22_c$ are provided for the respective motors, and are preferably of the double acting lever type. Controllers $22_a$ and $22_b$ are preferably adapted for hand operation, while controller $22_c$ may be adapted for either hand or foot operation.

In order that the significance of the control mechanism may be kept in mind, it may be helpful first to state briefly the different operations which are gone through in transporting a load to the head of the line and then returning the carriage to its original location.

*First operation.*—Assuming the load to be located near the tail tree 3, the operator moves the lever of controller $22_a$ in the proper direction to release brake $21_a$ and to wind up the inhaul line 7 until the load is raised to the desired point. At the same time he releases the brake $21_c$ of the slack pulling motor by means of controller $22_c$, thus allowing the slack pulling line 16, (which must pay out) to overhaul its motor C. During this operation, the outhaul line 11 and consequently skidding carriage 5, are held by brake $21_b$, brake $21_b$ being applied when the controller is set in the "off" position. (The same is true of brakes $21_a$ and $21_c$.)

*Second operation.*—The operator now moves controller $22_c$ in the direction to wind up slack pulling line 16 and maintain brake $21_c$ released and at the same time moves the lever of controller $22_b$ in the proper direction to pay out the outhaul line 11. The load is now moving toward the head tree 2 with its speed and position under accurate control of the operator through the regulation of the pay out speed of the outhaul line.

*Third operation.*—When the load reaches head tree 2 all drums are brought to a stop leaving the load suspended. Inhaul motor A is now reversed allowing the load to lower while slack pulling motor C is controlled to wind up slack pulling line 16 which is thus paid out.

*Fourth operation.*—After the load has been released, inhaul motor is operated to wind in the inhaul line, outhaul motor is held still while slack pulling motor is driven "out" until the end of line 7 is at or near carriage 8.

*Fifth operation.*—Motor B is now operated in the direction to wind up the outhaul line and the inhaul and slack pulling motors are operated to pay out the line, thus returning the skidding carriage 5 to the tail tree.

*Sixth operation.*—When the position above the new load is reached the outhaul motor is stopped, whereupon slack pulling motor C is reversed causing slack pulling line 16 to pull on inhaul line 7 and lower the tongs or chokers attached to the end of the inhaul line 7. After sufficient slack is obtained, the inhaul and slack pulling lines are stopped, thus completing the cycle.

From the foregoing it will be seen that the direction of rotation of the slack pulling motor C is "out" on the first operation, "in" on the second and third, out on the fourth and fifth and in on the sixth, thus requiring four reversals during one operating cycle. It will therefore be readily understood that the operation of the system will be greatly facilitated if the direction of operation of the slack pulling motor be automatically determined thus allowing the operator to give his entire attention to the maintaining of the three operating lines in the proper tension. It will also be apparent that there is a tendency of the carriage to travel ahead of the load and thus allow it to drop unless the proper braking action be supplied to the drum 12 paying out outhaul cable 11. This braking action I preferably effect dynamically and the circuits for accomplishing this as well as those of the control system as a whole will now be described.

In Fig. 3, I have shown the control circuits of the three motors including the three controllers which have been represented diagrammatically. The operating circuits for motors A and B are identical save for certain special auxiliary circuits, to be later described. Describing now the control circuits for motor A, $22_a$ represents generally a master controller arranged for hand operation as previously described. 31 and 32 represent respectively groups of interconnected segments which are mounted on a common drum, not shown, operated by an appropriate lever as shown in Fig. 2. Segments 31 and 32 are adapted to engage a series of stationary contacts designated as a group by 33.

A main power line L and a pilot power line P are common to all three motors. As shown, motor A has an armature $a$ and a series field SF. Resistors $R_2$, $R_3$, $R_4$, and resistors $R_5$ and $R_6$, are adapted to be cut into the armature circuit of motor A by means of contacts $r_2$ to $r_6$, respectively. In addition, a resistor $R_8$ is adapted to be connected in parallel with series field SF by means of contactor $r_8$. Contactors $r_2$ to $r_6$, inclusive and $r_8$ are actuated by means of pilot lines having the same designation. Brake actuating mechanism $21_a$ for brake $210_a$ is provided with similar pilot lines similarly designated, such pilot lines being joined to contacts 33, each of which has the same designation as its respective pilot line. Pilot line P is likewise joined to contact P, whereby when its opposite contact segment 31 or 32 is engaged with said contact, a pilot circuit is established through such other contact segments and stationary contacts as may be in simultaneous contact. This will be clear from the following description of the sequence of operations when the controller of motor A is moved in the "in" direction.

In contact position 1, pilot current flows from contactor P to its opposite segment 32, thence to segment 32 opposite contact $21_a$, through pilot circuit $21_a$ to brake actuating mechanism $21_a$ of brake $210_a$, and thence to ground, thereby releasing the brake. Referring to Fig. 5, it will be seen that in position 1 or 1' of the controller, contactor 35 is closed thereby making a dynamic braking circuit involving series field SF and resistors $R_4$, $R_6$, and $R_5$. This prevents the drum from attaining a dangerous speed while the brake is off and before the motor is connected to the line. At position 2 of the controller in the "in" direction, two new control circuits are made, one through pilot line 35—36 actuating normally closed contactor 35 and contactor 36 which is normally open. In addition, circuit is made through pilot circuit 37 to contactor 37. The effect of making these two circuits, thereby closing contactors 36 and 37 and opening contactor 35 is to connect the motor A to the line through a circuit traced as follows: from line L to knife switch 38, through contactor 37, resistors $R_6$, $R_5$, motor armature $a$, series field SF, resistors $R_4$, $R_3$, $R_2$, contactor 36, knife switch 38' to ground. Thus motor A operates as a series motor with resistance in the armature circuit as indicated in Fig. 5ª. Positions 3, 4, 5, 6 and 7 successively cut out resistors $R_2$, $R_3$, $R_4$, $R_5$, and $R_6$ by closing the corresponding contactors $r_2$ to $r_6$ through circuits which may be easily traced. Thus in position 7 of the controller, the motor A is connected directly across the line with the speed dependent upon the load.

If, now, master controller $22_a$ be thrown in the "out" direction, in position 1', brake $21_a$ is released as before. In position 2', pilot circuits are made through circuit 35—36 as previous described. In addition, circuits are made through contactors $r_6$, $r_5$, $r_4$, $r_3$ and $r_2$ as in position 7 of master controller $22_a$. A still further circuit is made through contact 39—40, contactor 39 and contactor 40, the operation of these contactors starts motor A in the reverse direction and as a shunt motor, the circuit being as follows, reference also being had to Fig. 6. Current from the line L passes through knife switch 38, contactor 39, resistor $R_9$, motor armature $a$, closed contactors $r_5$, $r_6$, resistor $r_7$, closed contactor 40, (contactor 35 being open) closed contactor 36 and knife switch 38' to ground. The field circuit is traced through knife switch 38, contactor 39, resistor $R_9$, series field SF, closed contactors $r_4$, $r_3$, $r_2$, contactor 36 and knife switch 38' to ground. It will be noted that in position 2' there is the minimum amount of resistance both in the field and in the armature circuits, whereby the greatest dynamic braking effect is obtained. Position 3' of controller 30 cuts in resistors $R_5$ and $R_6$ by de-energizing contactors $r_5$ and $r_6$ thus allowing the speed to increase, (Fig. 7). Similarly, position 4' cuts in resistor $R_4$ and position 5' cuts in resistor $R_3$. By tracing the circuits, it will be seen that for position 5' resistors $R_5$ and $R_6$ are placed in the armature circuit, while resistors $R_4$ and $R_3$ are common to both armature and field circuits. Thus the field is weakened, whereby the motor speed tends to increase in spite of the additional resistance placed in the armature circuits, such resistance having the effect of reducing the dynamic braking in case the motor is overhauling. Position 6' further increases the speed by de-energizing contactor $r_2$, thus cutting in resistor $R_2$. In addition, contactors $r_6$ and $r_5$ are energized, thus cutting out resistor $R_6$ and $R_5$. In position 6' contactor $r_9$ is also energized, thus taking out resistor $R_9$. Thus less resistance is placed in the armature circuit whereby the motor speed is allowed still further to increase. In position 7' contactor $r_8$ is energized placing resistor $R_8$ in parallel with the field SF thereby still further weakening it and allowing the speed to increase. The circuit for position 7' is given in Fig. 8. In this position the motor A has the maximum speed. When master controller 30 is returned to the "off" position all conductors are de-energized and brake $210_a$ is set.

The operation of master controller $22_b$ of motor B is identical with that of $22_a$ for motor A and a description of its operation will therefore not be given. In Fig. 3 of the drawing the circuit elements in the circuits of motor B which correspond to those of motor A, are given the same symbol additioned by subscript "b".

In the circuits of motor A and B, provision is made for certain additional sets of contacts. Thus in the circuit of motor A contactor 37 simultaneously operates normally open contacts 41 and 42, while contactor 39 operates normally open contacts 43 and 44. In the circuit of motor B contactor $37_b$ operates a normally open contact 45, contactor $39_b$ operates a normally open contact 46 and contactor $36_b$ operates a normally closed contact 47. It will be noted that contacts 41 and 42 operate only when motor A is operated in the "in" direction. Contacts 43 and 44, moreover, are operated only when motor A is driven in the "out" direction, while in the case of motor B, contact 45 is closed in the "in" direction, contact 46 closed in the "out" direction, while contact 47 is closed only when motor B is not running.

The function of these extra contacts will be described in connection with the operation of slack pulling motor C, their function being to accomplish the automatic direction control of motor C. The operation of the circuits of motor C will now be described. As before, motor C has an operating controller $22_c$ (Fig. 2) similar to controllers $22_a$ and $22_b$, but preferably arranged for operation by a knee lever. Contact segments $31_c$ and $32_c$ are mounted on a common drum, as in the case of motors A and B. These contact segments $31_c$ and $32_c$ are adapted to engage stationary contacts designated as a group by $33_c$. Motor C is operated as a shunt motor when controller $22_c$ is thrown in one direction and as a series motor when thrown in the other direction, but motor C differs from motors A and B in that the direction of rotation of the motor is not determined by the controller. The direction of rotation of motor C is determined by the auxiliary contacts 41 to 47, inclusive, described in connection with motors A and B. As will be described in detail these contacts function automatically to provide the proper direction of rotation without any attention from the operator who merely secures the speed and operating characteristics needed to meet the requirements. However, a manually operated switch 48, which will be later described, enables the operator to control directly the direction of rotation of motor C, should he find it necessary to do so, as, for example, in order to meet unusual conditions not encountered in the normal operation of the machine.

The operation of controller $22_c$ will now be described without reference to the direction of rotation. When controller $22_c$ is thrown in the "series" direction, brake $210_c$ is released at position 1 of the controller by means of actuating mechanism $21_c$. Position 2 starts the motor, the circuit being similar to position 2 in the "in" direction of motors A and B. Thus in position 2 motor C is connected to the line through knife switch $38_c$, contactor $39_c$, series field SF, contactor 49 (or 50), armature $a$ of motor C and contactor 51 (or 52), thence to starting resistors $R_{4c}$, $R_{3c}$, $R_{2c}$, closed contactor $36_c$, knife switch $38_c$ to ground. Position 3 of the controller energizes normally closed contactor $r_{1c}$ thereby placing resistor $R_{1c}$ in parallel with the armature $a$ of motor C. This has the effect of securing a steady slow speed. In positions 4, 5 and 6 of the controller $22_c$ starting resistors $R_{2c}$, $R_{3c}$, $R_{4c}$ are successively cut out, thus connecting the motor directly across the line. The master controller $22_c$ is thrown in the series direction whenever considerable power is needed. During most of the operating cycle, however, a relatively small amount of power is needed, the chief consideration being the securing of a proper speed of motor C whereby the proper tension will be had on slack pulling cable 16, while the latter is either wound up or paid out. During this major portion of the cycle the motor C is operated as a shunt motor. When controller $22_c$ is thrown in the "shunt" direction, position 1' releases the brake and provides a coasting point. In position 2', a pilot circuit is made through circuit $36_c$, thus actuating contactor $36_c$. A pilot circuit is also made through circuit 53—54 thereby closing contactors 53, 54. The motor C now operates as a shunt motor, the circuits being traced as follows: The armature circuit is from line L through knife switch $38_c$, contactor 53, direction contactor 49 (or 50), armature $a$ of motor C, direction contactor 51 (or 52) and resistors $R_{4c}$, $R_{3c}$, $R_{2c}$, contactor 36C, knife switch $38'_c$, to ground. The field circuit is from line L over a path already traced through contactor 53, thence through field SF of motor C, contactor 54, resistor $R_{5c}$ and contactor $36_c$, knife switch $38'_c$, to ground. As contactor $r_{1c}$ is normally closed and not energized in the "shunt" direction of the master, the armature shunt resistor $R_{1c}$ is always in the circuit to keep the speed steady during fluctuation of load. In positions 3' and 4' contactors $r_{2c}$ and $r_{3c}$, are energized thus short circuiting resistors $R_{2c}$ and $R_{3c}$, and thereby increasing the speed. In position 5', resistors $R_{2c}$ and $R_{3c}$ are cut back into the armature circuit, but in addition a pilot circuit is made through contactor $r_{6c}$, whereby contactor $r_{6c}$ is closed and a resistor $R_{6c}$ placed in parallel with field SF. The thus weakened field causes the motor speed to increase in spite of the speed decreasing effect of resistors $R_{2c}$ and $R_{3c}$ placed in the armature circuit. In position 6' resistor $R_{2c}$ is cut out whereby the motor C attains its maximum speed as a shunt motor. Returning the master controller $22_c$ to the "off" position opens the circuit from line L, puts on the brake $21_c$ and stops the motor.

The operating cycle of the three motors will now be described to show how the automatic control for the slack pulling motor functions to determine the direction of operation. It will be convenient to tabulate the direction of operation of each motor for the six steps constituting the operation cycle previously described in detail.

| Operation. | Inhaul, motor A. | Outhaul, motor B. | Slack pulling, motor C. |
|---|---|---|---|
| 1 | In | Still | Out |
| 2 | In | Out | In |
| 3 | Out | Still | In |
| 4 | In | Still | Out |
| 5 | Out | In | Out |
| 6 | Out | Still | In |

Now in operation 1, when motor A is operating "in" contactor 37 will be energized thereby closing contacts 41 and 42, reference being had to Fig. 3. With motor B idle, contactor $36_b$ is open and its normally closed auxiliary contact 47 is closed. Therefore a pilot circuit will now be made from pilot line P through the coils of contactors 49 and 51 in parallel, contact 42, pilot line 56 thence to contact 47 operated by contactor $36_b$ of motor B and thence to ground. This closes the direction control contactors 49 and 51 of motor C thereby causing motor C to operate in the "out" direction if the operator has the master $22_c$ in the running position.

In operation 2, when motor B is started, contactor $36_b$ is closed, thereby opening contact 47. This breaks the circuit through pilot line 56, whereby contactor 37 is no longer operative to make a circuit through direction control contactors 49—51. A circuit, however, is established from pilot line P, direction control contactors 50—52, pilot line 50—52, contact 41 of contactor 37, line 57, contact 46 of contactor $36_b$ (now closed, since motor B is running in the "out" direction) and to ground. Therefore, direction control contactors 50—52 are operated to cause motor C to run in the "in" direction when controller $22_c$ is placed in an operative position.

In operation 3, motor B is still, whereby contact 47 is closed and contact 46 (as well as contact 45) is open. This situation is similar to operation 1, except that now motor A is running in the "out" direction instead of in the "in". Therefore, contactor 39 is closed while contactor 37 is open. When contactor 39 is closed, a circuit is established as follows: from pilot line P through direction control contactors 50—52, line 50—52, contactor 43 to line 56, which as previously stated, is grounded through contact 47 when motor B is not operating. Thus, in operation 3, contactors 50—52 are operated to drive motor C in the "in" direction when its controller is moved to an operating position.

An inspection of the above table will show that for the 4th operation, the relative operating directions of the three motors are the same as in operation 1, which has already been described.

In the 5th operation, starting motor B breaks the circuit through line 56 by opening contact 47, and, since motor B is operating in the "in" direction, contactor $37_b$ is closed, thereby grounding a line 58 through contact 45. A circuit will now be made as follows: from pilot line P through direction control contactors 49—51, line 49—51, contact 44 of contactor 39 (which is actuated since motor A is running in the "out" direction), line 58 to ground, thereby setting motor C for operating in the "out" direction.

It will be noted that the 6th and last operation calls for the same relative operation of the three motors as does operation 3, the circuits for which have already been described. However, for this operation, the maximum power is required for slack-pulling motor C, and accordingly the operator moves controller $22_c$ in the "series" direction.

It will be seen from the foregoing description that the direction of operation or state of rest of motor A and B relative to each other automatically determines the direction of rotation of slack-pulling motor C, which will operate in the proper direction for the operation to be undergone. With respect to motor C, he need only to regulate the speed to suit requirements. That is, direction of operation of motor A determines that of motor C provided that motor B is disconnected from the line. When motor B, however, is connected to the line its direction of operation determines that of motor C to the exclusion of motor A provided motor A is running in the proper direction. On the other hand, if motor A should be set for the wrong direction (while motor B is running), motor C cannot be started at all, since the operative circuit for direction controls 49—51 and 50—52 of motor C controlled by contactor $37_b$ is made through an auxiliary contact of contactor 39, while that controlled by contactor $39_b$ is made through an auxiliary contact of contactor 37.

Referring to Fig. 3, it will be noted that either pilot line 50—52 or 49—51 may be grounded by means of knife switch 48 which is under the control of the operator. The latter is thus able manually to control the direction of motor C whenever this should be necessary.

It will be understood that for commercial operation, the motor circuits above described will be equipped with automatic relays which will cut in resistance in the armature circuits (as, for example, resistors R, 2R, 4R) whenever the armature current rises above a predetermined value, and will automatically cut out such resistance when the current has decreased below such value. In addition, the motor circuits will be equipped with time-limit overload relays, which, in case of excessive overloading lasting for too long a time, will de-energize all contactors and open the circuit. The construction and arrangement of these features being standard in the art and per se forming no part of the present invention, they have not been included in the description and drawings.

It will be further understood that the feature of the automatic direction control for the motor C, which forms a part of my invention, is susceptible of application to other motor-driven systems, and that it is, therefore, my intention to claim such feature of control without reference to the specific system described.

While I have illustrated and described my invention as applied to a direct current system, it will be understood that it is equally applicable to alternating current.

I claim:

1. In a traversing system, a track, a load-carrying device adapted to traverse same, inhaul and outhaul cables operatively attached to said device, inhaul and outhaul drums upon which the respective cables are wound, a separate electric motor driving each of said drums and an independent control means for each motor, the control means for said inhaul motor comprising means for operating said inhaul motor as a series motor in the "in" direction and as a shunt motor in the "out" direction.

2. In a traversing system, a track, a load-carrying device adapted to traverse same, inhaul and outhaul cables operatively attached to said device, inhaul and outhaul drums upon which the respective cables are wound, a separate electric motor driving each of said drums and an independent control means for each motor comprising means for driving each respective motor as a series motor in the "in" direction and as a shunt motor in the "out" direction.

3. In a traversing system, a track, a load-carrying device adapted to traverse same, inhaul and outhaul cables operatively attached to said device, inhaul and outhaul drums upon which the respective cables are wound, a separate electric motor driving each of said drums and an independent control means for each motor, the control means for said inhaul motor comprising means for operating said inhaul motor as a series motor in the "in" direction and the control means for said outhaul motor comprising means for driving said outhaul motor as a shunt motor when said inhaul motor is operating in the "in" direction.

4. In a traversing system, a track, a load-carrying device adapted to traverse same, inhaul and outhaul cables operatively attached to said device, inhaul and outhaul drums upon which the respective cables are wound, a separate electric motor driving each of said drums and an independent control means for each motor, the control means for said inhaul motor comprising means for operating said inhaul motor as a series motor in the "in" direction and the control means for said outhaul motor comprising means for driving said outhaul motor as a shunt motor when said inhaul motor is operating in the "in" direction, the circuit for shunt operation for said outhaul motor including a dynamic braking circuit and means to vary the energy absorbed by said circuit.

5. In a traversing system, a track, a load-carrying device adapted to traverse same, inhaul and outhaul cables operatively attached to said device, inhaul and outhaul drums upon which the respective cables are wound, a separate electric motor driving each of said drums and an independent control means for each motor, the circuit for shunt operation for each motor including a dynamic braking circuit and means for varying the energy absorbed by said circuit.

6. In a traversing system, a track, a load-carrying device adapted to traverse same, inhaul and outhaul cables operatively attached to said device, inhaul and outhaul drums upon which the respective cables are wound, a separate electric motor driving each of said drums, and an independent control means for each motor comprising means for driving each respective motor as a series motor in the "in" direction and as a shunt motor in the "out" direction, a slack pulling cable, a drum upon which said cable is wound, a motor driving the slack pulling drum, and speed and direction control means therefor.

7. In a traversing system, a track, a load-carrying device adapted to traverse same, inhaul and outhaul cables operatively attached to said device, inhaul and outhaul drums upon which the respective cables are wound, a separate motor driving each of said drums, independent control means for each motor whereby an operator may control the speed and direction of operation of each of said motors, a slack-pulling cable, a drum upon which said cable is wound, a motor driving the slack-pulling drum, speed control means therefor and means for automatically determining the direction of operation of said slack-pulling motor, actuated by the control means for the two first mentioned motors.

8. In a traversing system, a track, a load-carrying device adapted to traverse same, inhaul and outhaul cables operatively attached to said device, inhaul and outhaul drums upon which the respective cables are wound, a separate motor driving each of said drums, independent control means for each motor whereby an operator may control the speed and direction of operation of each of said motors, a slack-pulling cable, a drum upon which said cable is wound, a motor driving the slack-pulling drum, speed control means therefor and means for automatically determining the direction of operation of said slack-pulling motor, actuated by the control means for the two first mentioned motors and manually operated means for determining the direction of operation of said slack-pulling motor, said manually operated means having precedence over said automatic means.

9. In combination, three motors, independent speed and direction controls for said first and second motors, means whereby the direction of operation of said first motor determines that of the third motor when said second motor is disconnected from the line, means rendering said first mentioned means inoperative when said second motor is connected to the line, and means whereby the direction of operation of said second motor determines that of said third motor when said second motor is connected to the line.

MORGAN WASHBURN, Jr.